Sept. 27, 1932.  R. G. WHITLOCK  1,879,964
POSTAL MACHINE
Filed Oct. 16, 1928  9 Sheets-Sheet 7
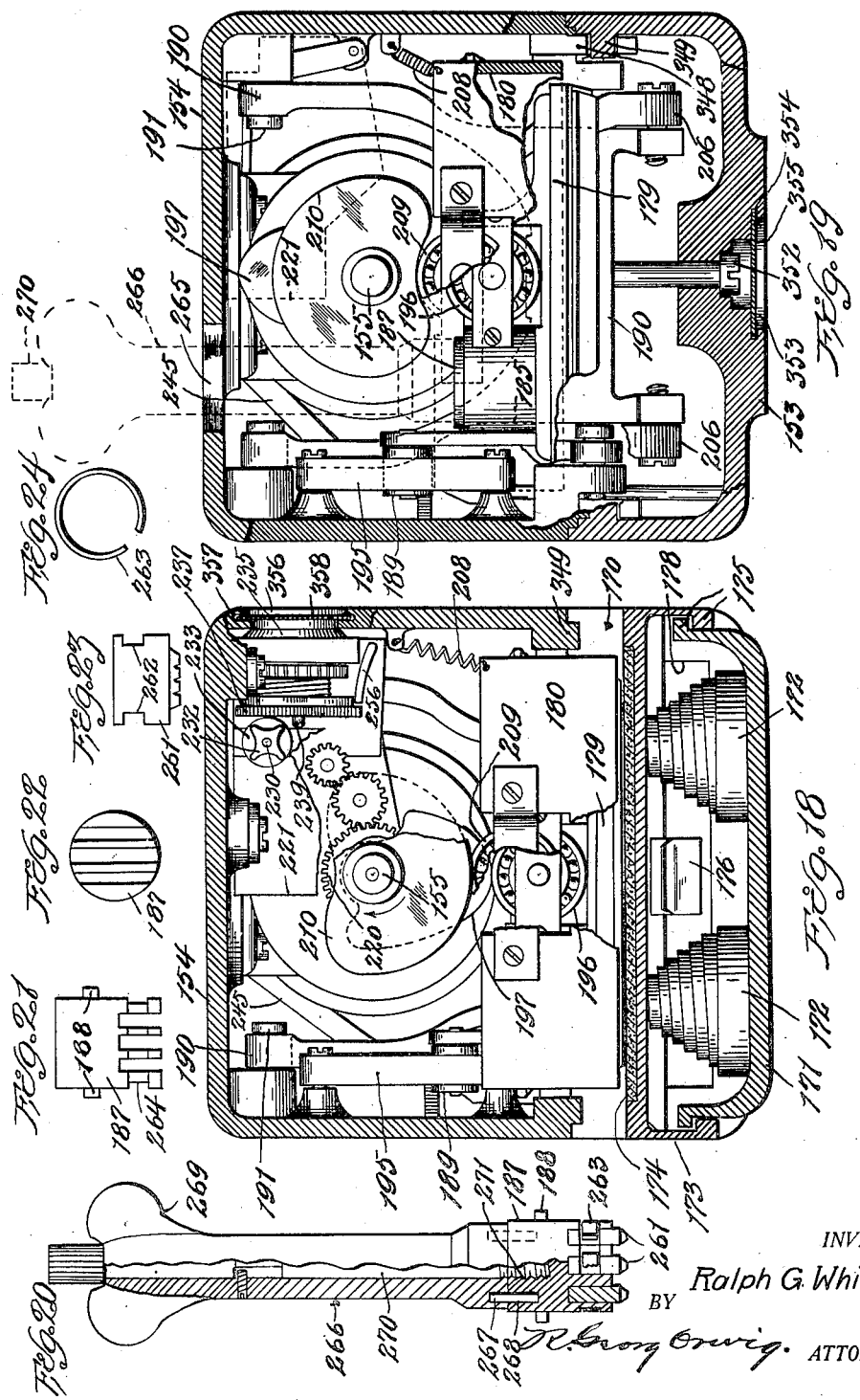
INVENTOR.
Ralph G. Whitlock
BY
R. George Orwig. ATTORNEY Sept. 27, 1932.     R. G. WHITLOCK     1,879,964
POSTAL MACHINE
Filed Oct. 16, 1928     9 Sheets-Sheet 8

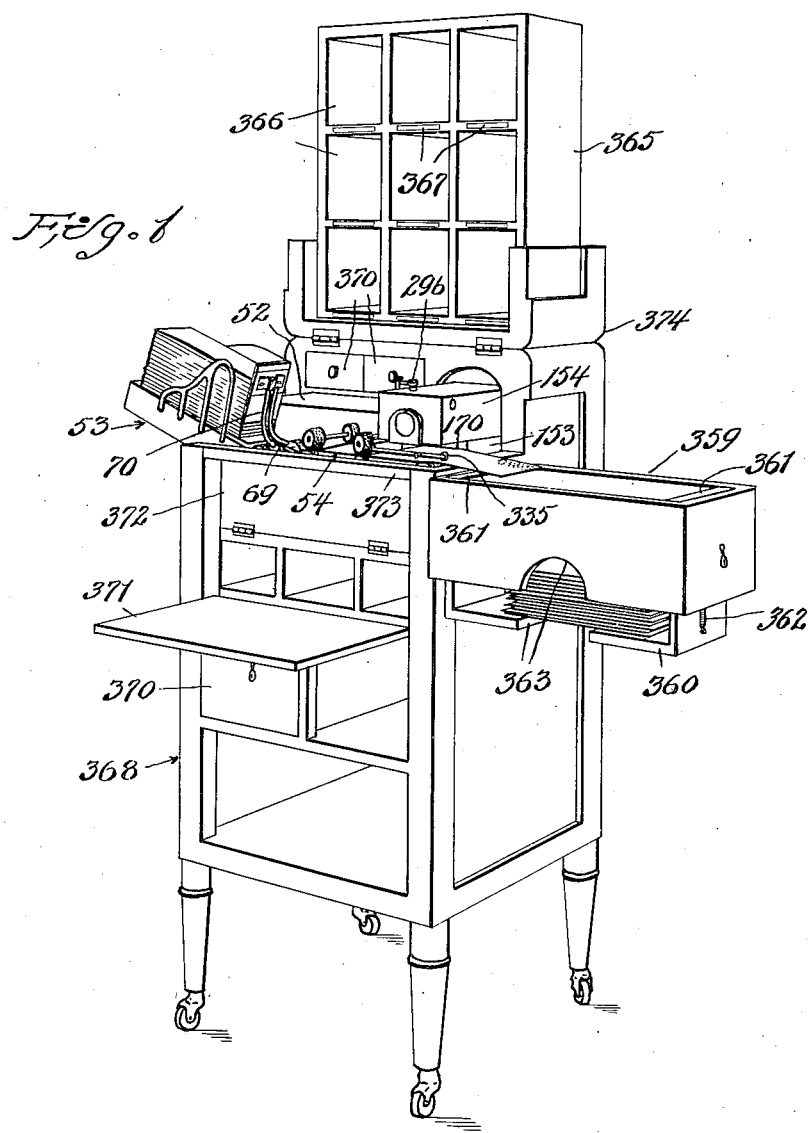

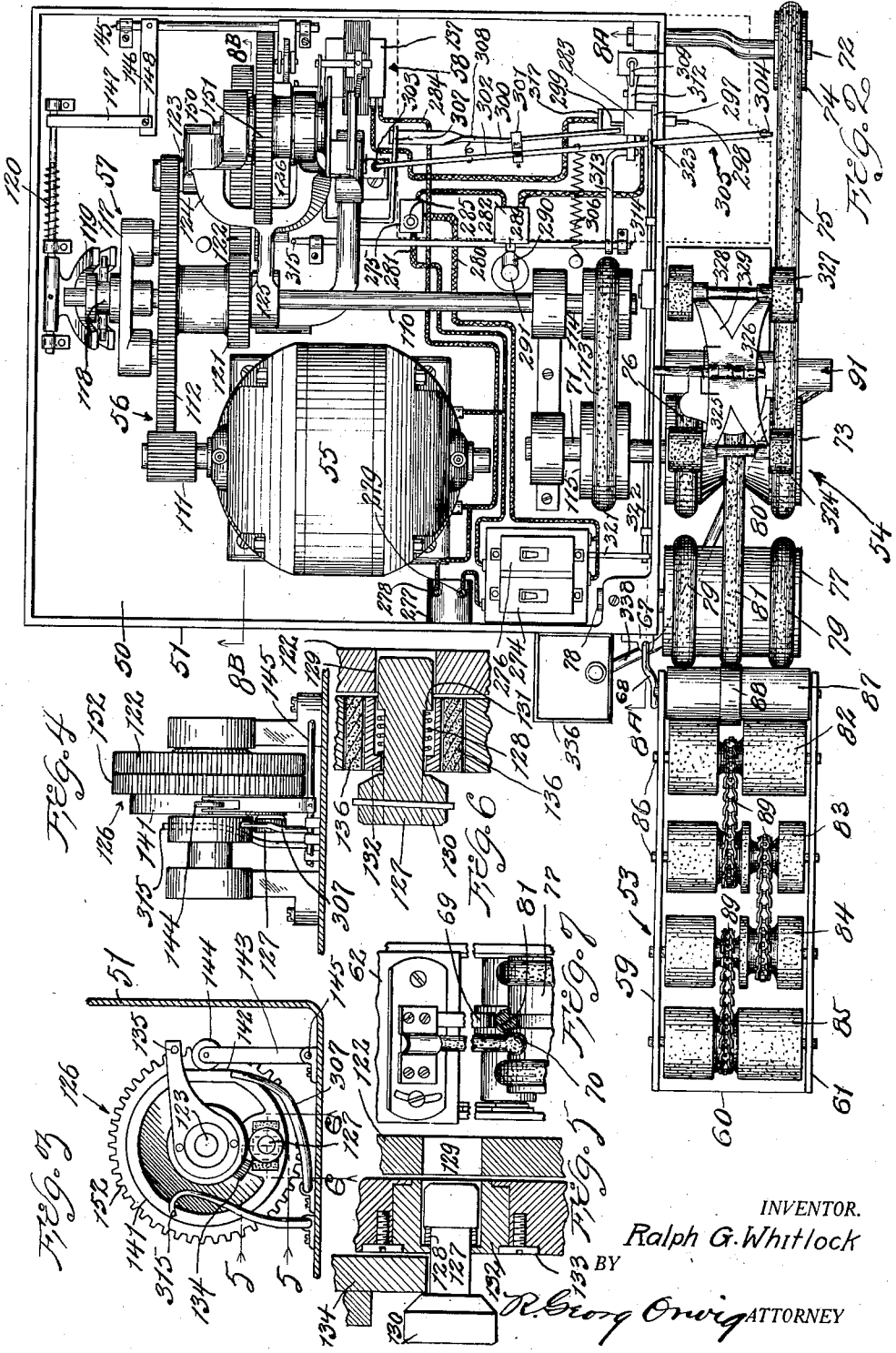

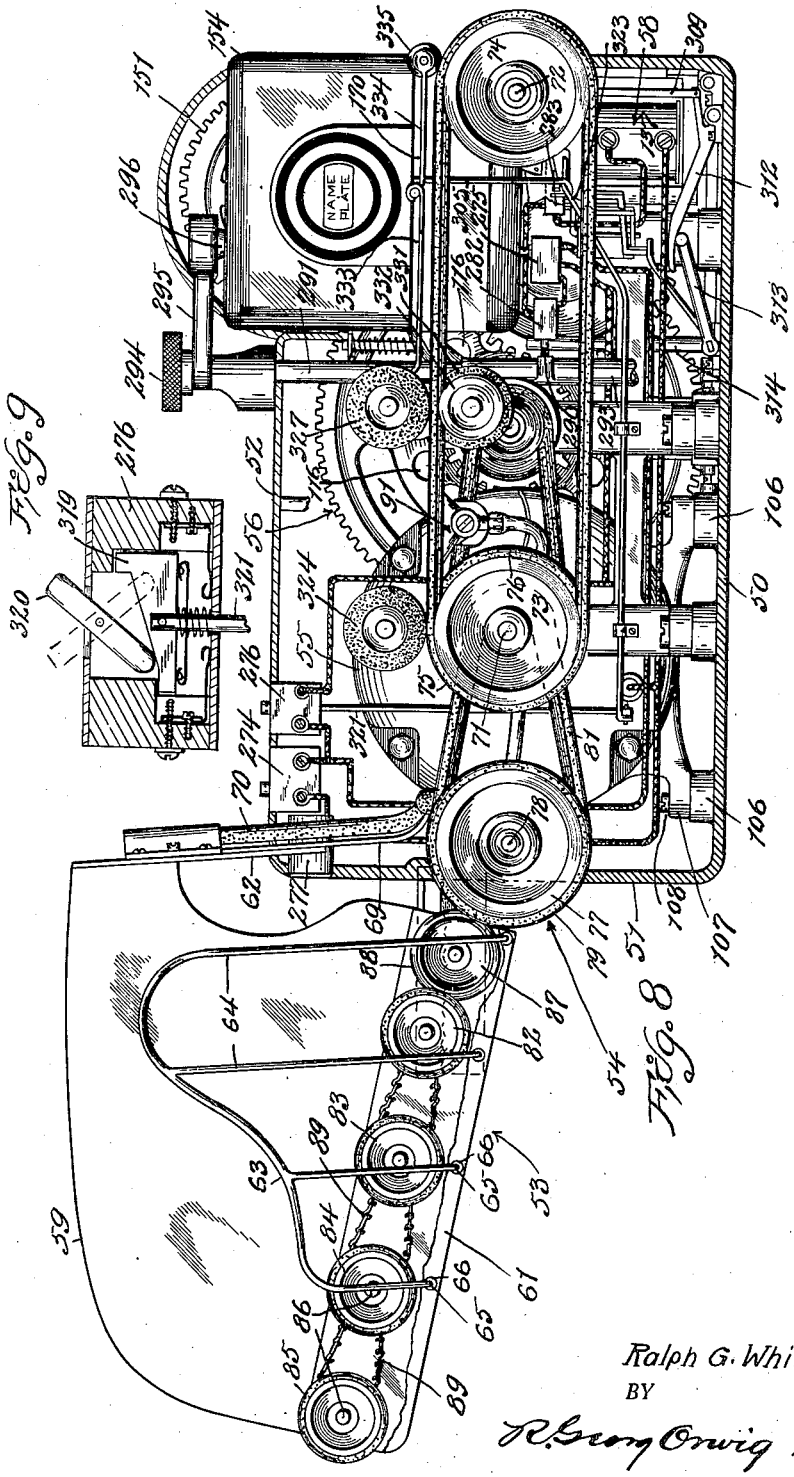

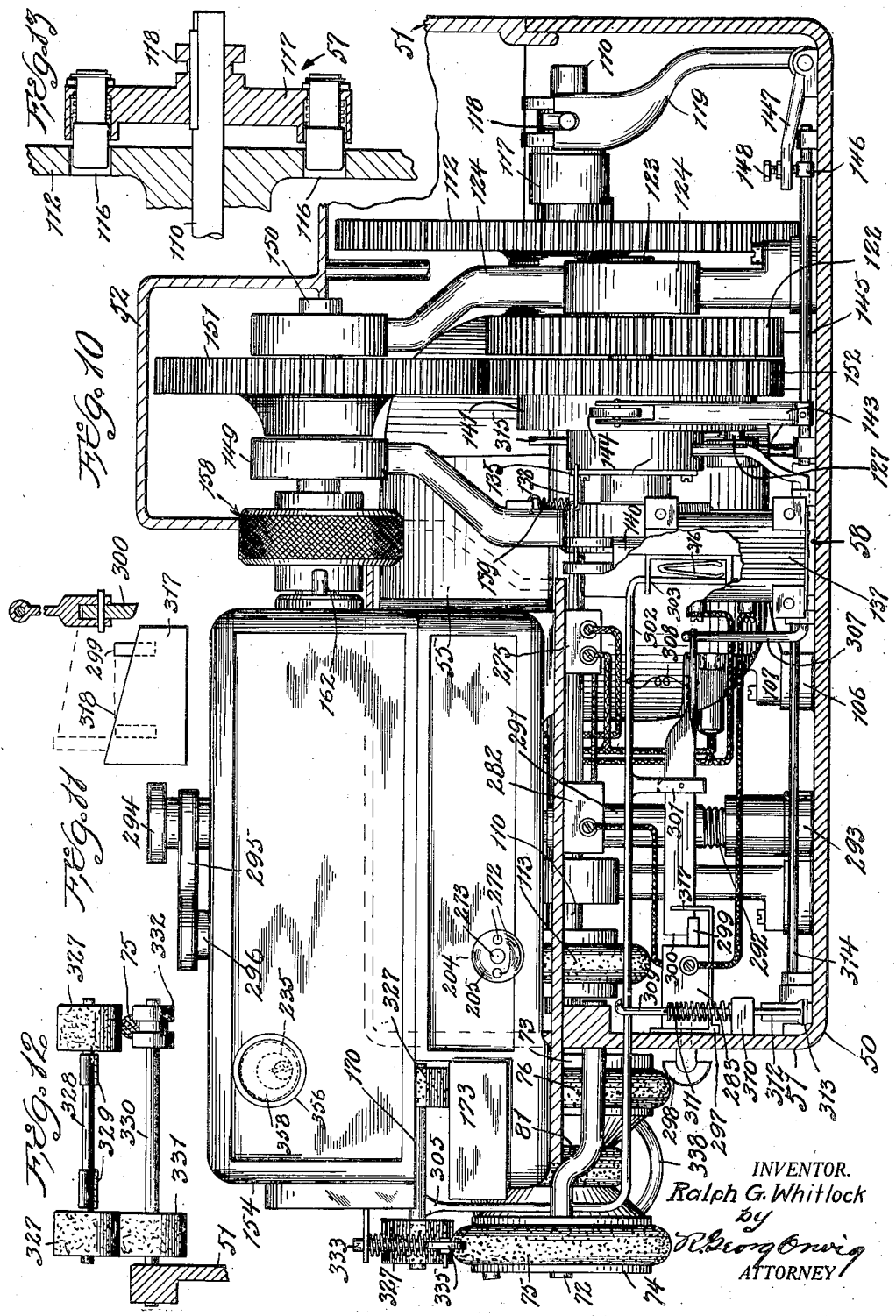

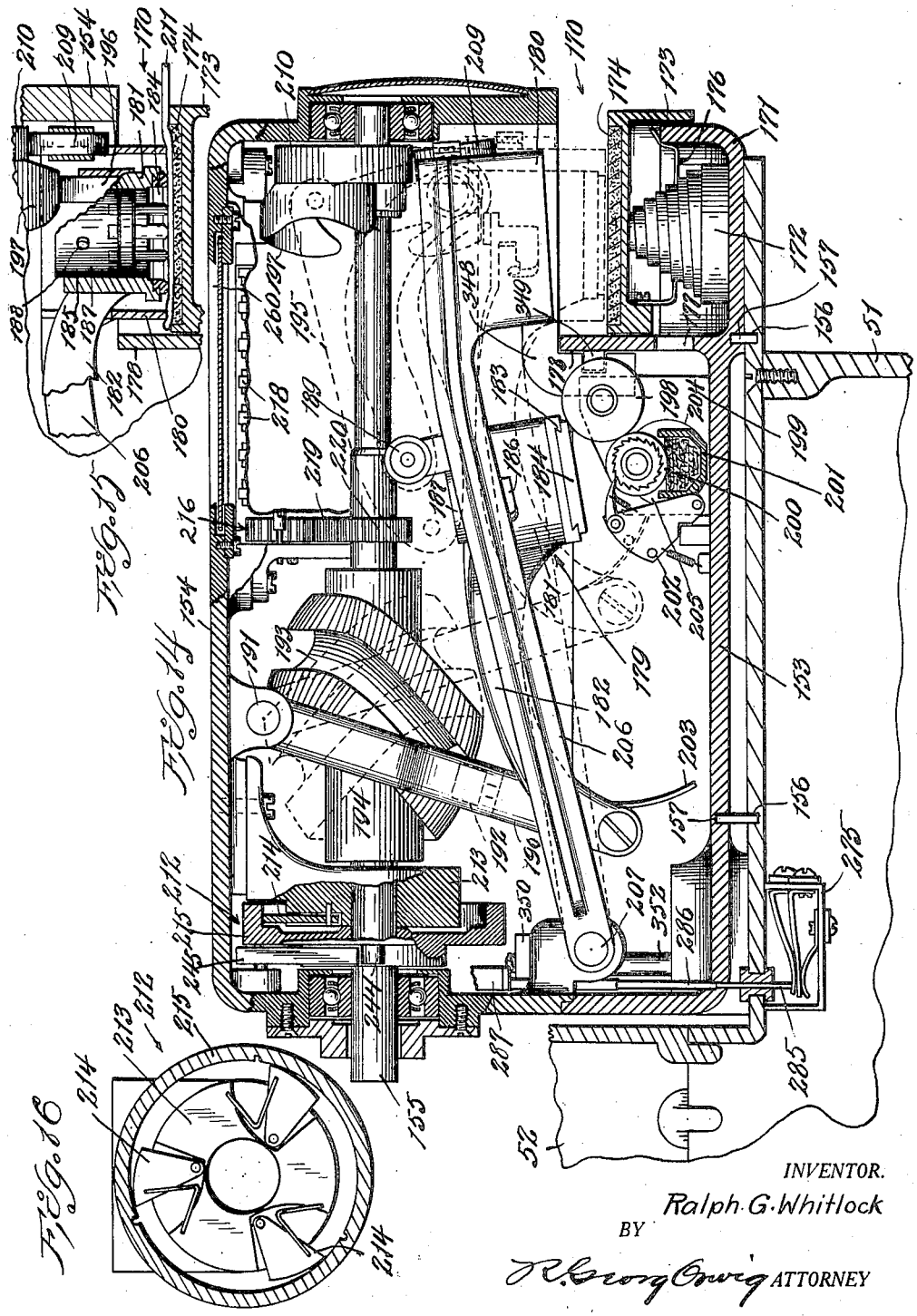

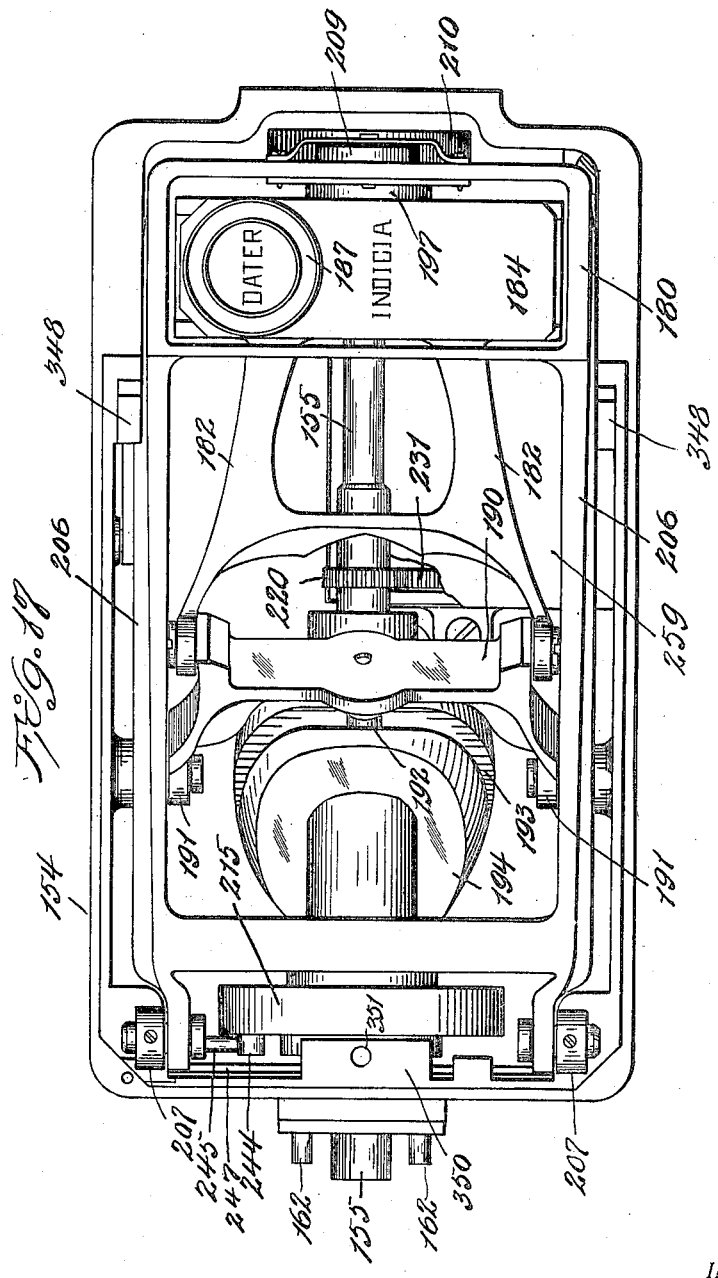

INVENTOR.
Ralph G. Whitlock
BY
ATTORNEY

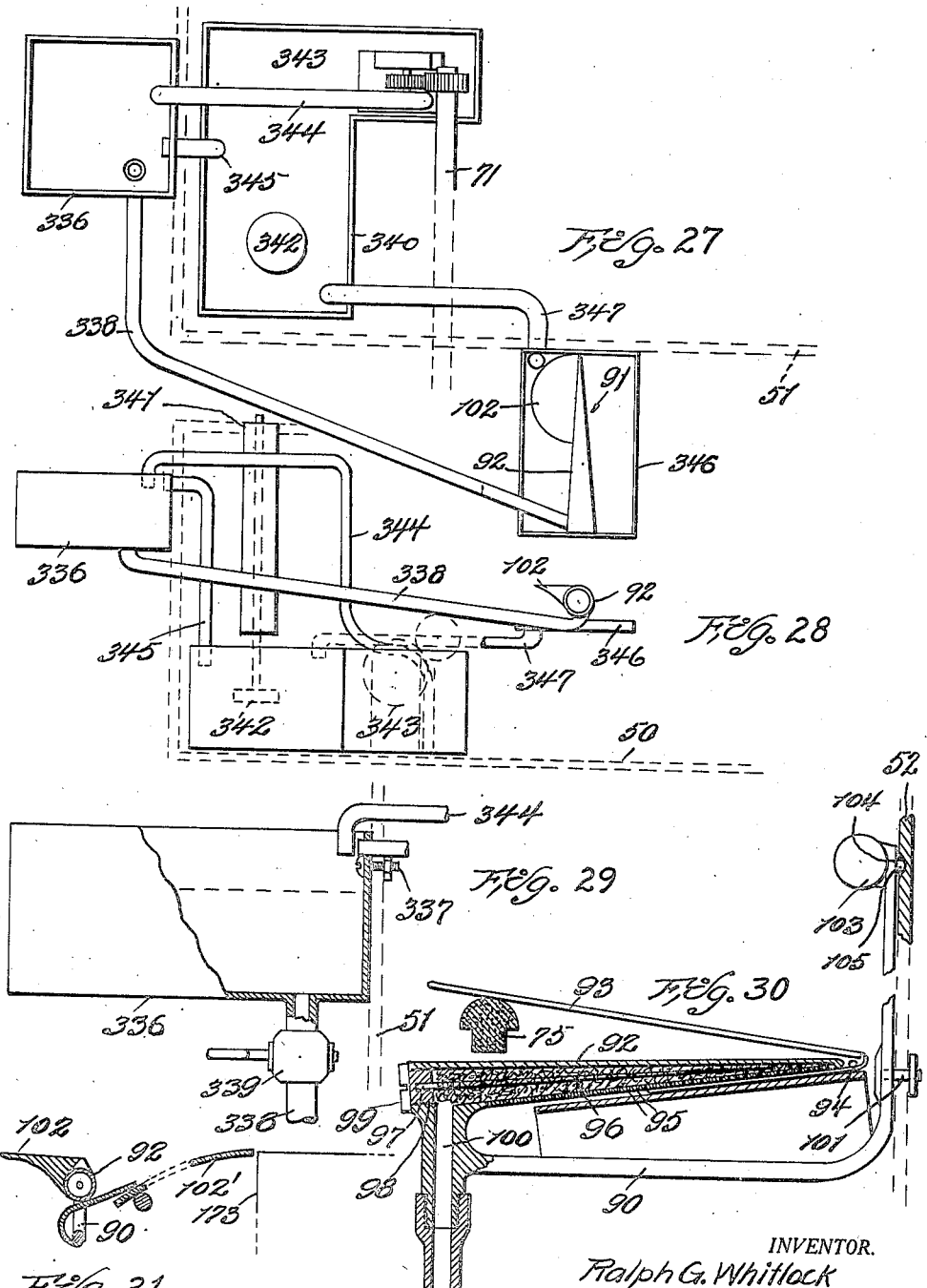

Patented Sept. 27, 1932

1,879,964

UNITED STATES PATENT OFFICE

RALPH G. WHITLOCK, OF LOS ANGELES, CALIFORNIA, ASSIGNOR TO RALPH G. WHITLOCK PATENTS, INC., OF LAS VEGAS, NEVADA, A CORPORATION OF NEVADA

POSTAL MACHINE

Application filed October 16, 1928. Serial No. 312,900.

This invention relates to improvements in machines for preparing certain matter for acceptance for mailing under permit, without stamps affixed, as provided by section 452, postal laws and regulations, effective April 1, 1927 and at the present time.

More particularly my invention relates to the indicia imprinting, of (ibid.) "metered permit mail" in that there is involved (ibid.) "recording mechanism to be set by the postmaster for a given number of impressions, and which automatically locks when such impressions have been exhausted". The invention further relates to other steps in the preparation of mail matter such as sealing and to the (ibid.) "facing" and "separation into states, cities, etc."

Objects of my invention are:

To provide a printing or numbering head of relatively compact construction and light of weight whereby "the mailer" may readily disconnect it as a unit from the rest of the machine, and carry it to the "post office" to (ibid.) "have the postmaster set it for a given number of impressions, the amount of postage to cover the number of such impressions to be paid at the time the device is set."

To provide a printing means and guard conjointly operating to prevent more than one indicia impression to a single meter action and to prepare and hold the impression areas of the mail pieces for impression reception.

To provide a meter controlled lock preventing action of the printing means upon exhaustion of the set number of impressions and means associated with the driving element for the printing means to limit its movements in only a direction tending to actuate the meter to take from its set number of impressions.

To provide means for conveying the mail pieces to and through the printing means affording definite location of their impression areas with respect to the printing means and to hold the pieces in a definite line of travel and discharge them in "faced" condition.

To provide a moistener in the path of the conveyor and to provide a motor drive for the printing means and conveyor including means for selectively or jointly operating the machine for printing and moistening.

To provide sealing means, for directly receiving moistened and "stamped" envelopes in superimposed arrangement, having means whereby the lowermost envelopes may be removed after sealing, and to permit continuous performance.

To provide a case having designated compartments for separating the addressed, sealed and stamped mail pieces according to states, cities, etc. for facilitating their handling in mail.

To provide a structure, in the form of a cabinet in which all the several units of the apparatus, parts, keys, tools and the like may be housed and related for use and in which the apparatus may be handled in commerce as a unit.

To the above purposes my invention consists in the novel construction, arrangement and combination of parts as hereinafter fully, clearly and concisely described, definitely pointed out in my claims and illustrated by the accompanying drawings (9 sheets) in which—

Description of drawings.

Fig. 1 is a perspective view of the postal machine, cabinet, sealer and the separating case as related for operation.

Fig. 2 is a plan view of the postal machine with the printing head and casing parts removed.

Fig. 3 is an end elevation of the clutch, and its automatic actuating means, for the printing mechanism.

Fig. 4 is a side elevation of the clutch and actuating means shown in Fig. 3.

Fig. 5 is a detail section on enlarged scale taken on line 5—5 of Fig. 3 showing the clutch pin and actuating wedge.

Fig. 6 is a detail sectional plan view on enlarged scale taken on line 6—6 of Fig. 3.

Fig. 7 is an end elevation showing the stripper and presser foot and fragments of the rack and conveyor.

Fig. 8 is a front elevation of the postal machine, with the printing head and rack in place and showing the assembly element in section as taken on the line 8A—8A and the casing element in section as taken on the line 8B—8B of Fig. 2.

Fig. 9 is a detail sectional elevation of the relay switch and means for idling the interrupter.

Fig. 10 is a right hand elevation of the postal machine with the assembly element and casing shown in section.

Fig. 11 is an elevation, partly in section, showing the throw and positive actuator for the interrupter switch.

Fig. 12 is a detail elevation, partly in section showing a driving connection for the alining rollers of the conveyor.

Fig. 13 is a detail sectional elevation of a fragment of the conveyor clutch.

Fig. 14 is a longitudinal sectional elevation of the printing head, the base being in one plane of section and the head being shown in several planes of section for clarity of illustration, the printing member and guard box being shown in withdrawn position. Dotted lines indicate a printing position of the printing member and guard box.

Fig. 15 is a fragmental illustration of the printing head, guard box, their actuating cams and the platen in printing position.

Fig. 16 is a detail section of the direction control of the driven shaft of the printing head.

Fig. 17 is a bottom plan view of the printing head cap showing the printing member and guard box in printing positions.

Fig. 18 is a front elevation of the mechanism of the printing head, in printing position, the casing being in several planes of section for clarity in illustration.

Fig. 19 is a front elevation of the mechanism of the printing head, in nonprinting position, the plane of section being beyond the platen and in several other planes for clarity of illustration.

Fig. 20 is an elevation, partly in section, of the dater and dater key.

Fig. 21 is an elevation of the type holder of the dater.

Fig. 22 is an inverted plan view of the type holder.

Fig. 23 is an elevation of one of the types.

Fig. 24 is a plan view of the clamp ring for the type holder.

Fig. 27 is a diagrammatic plan view of the water supply means for the moistener.

Fig. 28 is a diagrammatic elevation of the water supply means.

Fig. 29 is a sectional elevation of the level tank for the moistener.

Fig. 30 is a sectional elevation of the flap opener and moistener.

Fig. 31 is an end view of the flap opener and moistener.

Assembly element

Figure 25:
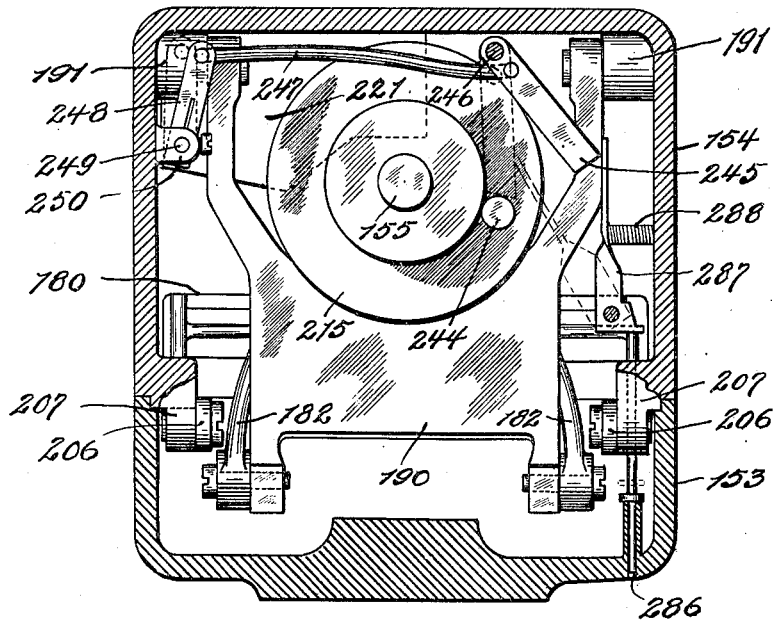
Fig. 25 is a rear elevation of the mechanism of the printing head showing the casing in section and the lock for the driven shaft in released position.
Figure 26:
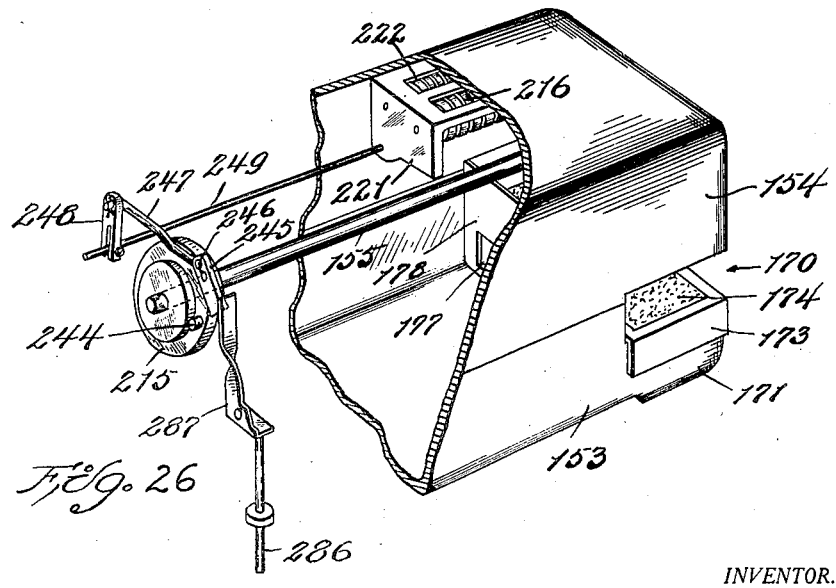
Fig. 26 is a perspective view of a fragment of the printing head, the lock for the driven shaft, the meter control for the lock and the lock control for a switch actuator.

For facility in assembling the several units of the machine, and the several parts of the units; for economy in construction; for accuracy in relation of the parts and units and for relative securing and locking of certain of the several units against unauthorized separation, I provide an assembly element which comprises a bed 50 and in the form shown, in Figs. 2, 8 and 10, certain fixed parts 51 serving as a casing and certain removable and replaceable casing parts 52. To the assembly element, all of the actuating parts of the machine have predetermined location and are definitely related for operation and coaction.

The moistener unit

This unit comprises the recited assembly element; a hopper or rack 53; a conveyor 54; a motor 55; a driving gear 56 including a clutch 57 and an electro-mechanical clutch operating means 58. (Figs. 2 and 8.)

The rack shown has a sheet metal body including a back 59, a distance piece 60; a front flange 61 and an end wall, or gate, 62. The front 63 of the rack is made of open work, as of spaced wires 64 whereby manipulation of a stack, or pile of pieces of mail matter may be facilitated.

By preference the front is bodily adjustable laterally relative to the back for the handling of mail pieces of varying width dimensions as by the extension 65 of the wire front and the sleeves 66 supported in the sheet metal body, as shown in Fig. 8.

By preference and as shown in Fig. 2, the rack is mounted in a manner to permit a bodily swinging motion and to provide for its total removal from the assembly element. To this end there is formed upon the assembly element a bearing 67 to receive a pin, or shaft 68 secured to the rack. Carried by the end wall, or gate is a presser foot 69 and a stripper 70 which will be hereinafter made more clear.

The conveyor is a composite structure and comprises a driven shaft 71 and a stub shaft 72, the former of which carries a drum 73, having a length approximating the average width dimension of pieces of mail and the latter of which carries a pulley 74, spaced from the body of the assembly element. Extending around the drum, adjacent its outer end and about the pulley 74 is a belt 75 and extending about the drum 73 alone adjacent its inner end, is a tire 76.

A drum, 77 carried on a shaft 78, in advance of the drum 73 is substantially the length of the drum 73. Tires 79 encircle the drum 77 one of which is in approximate alinement with the belt 75 and the other with the tire 76. The drum 73 has a diametrical reduction 80 adjacent its longitudinal center, as shown, to receive a belt 81 that extends about the drum 77 whereby the drum 77 receives motion from, and at lesser speed than, the drum 73.

The feeding, or rack, section of the conveyor comprises a plurality of rollers 82, 83, 84 and 85 all mounted on shafts 86 having support in the back and flange of the rack. At the rear end of the rack there is a friction roller 87, supported on a shaft carried by the rack, and which roller bears such relation to the belt 81 and the roller 82 as to form a driving connection therebetween. In view of the swinging mount for the rack there is requirement for a definite, single, point of contact between the friction roller 87 and an element of the power driven conveyor. This is accomplished by the collet 88 formed on the friction roller for engagement only with the driving belt 81 for the drum 77.

The reduction 80, Fig. 2 in the drum 73 provides a peripheral speed of the drum 77 greater than the peripheral speed of the belt 75, and by means of a series of sprocket gears and associated chain connections 89 the several rollers of the rack section, have progressively increasing peripheral speeds from roller 85 through rollers 84, 83 and 82, thus increasing the speed of the envelope being operated upon as it passes from the stack through the conveyor.

*Flap guiding and moistening means*

Extending laterally from the assembly element to project across the path of the conveyor is an arbor 90, for the support of a unitary structure 91 comprising a flap moistener means best shown in Fig. 30, and means for guiding, or position relating, the flaps relative to the moistener.

By preference and as shown the moistener is constructed as a tubiform container 92 having an axial taper, whereby to provide a minimum sectional dimension for extension between the body 93 and the flap 94 of an envelope and to provide ample water capacity. In the bottom of the container 92 there is a plurality of spaced holes 95 through which the water content is delivered to the flaps. The container is provided with a filler 96, of bibulous material, such as cotton fiber and in order that the filler may be placed or withdrawn with facility and for replacement or for its use as a swab for the container, I prefer that the cotton fiber be wound upon or interwoven in or upon a handle or core 97. At the outer free end of the container there is a clean-cut opening 98, a screw plug 99 and a water inlet 100.

The axial plane of the moistener is substantially horizontal and the arbor 90 is secured to the assembly element by a pivot 101 at a point substantially alined with the axial plane of the moistener, so that when the arbor is swung on its pivot the container will be bodily rotated without disturbance of its bodily position relation with the conveyor.

The flap opener, guide, or position relating means, consists, as shown in Fig. 28, of a pin 102, preferably formed as a leaf of sheet metal, secured to and rotatable with the container, and whose free or forward margin is moved to or out of functioning position by a rotation of the moistener. A deflector 102' Fig. 31 is supported by the arbor 90 and extends toward the platen 173 for the purpose of restoring the flap and the envelope to the plane of the platen 173 whereby the envelope may pass over the platen without interference.

For convenience in moving the arbor I provide a handle 103, see Fig. 30 which stands upright adjacent the casing portion of the assembly element, and for the retention of the arbor in positions to set and hold the flap guide in either functioning or non-functioning position, I provide means such as a pair of dwells 104 in the casing and a detent, or boss 105 on the handle.

On the bed 50 of the assembly element I provide locaters 106 for the motor, the shell 107 of which is secured to the locaters as by screws 108 and by preference and as shown in Figs. 8 and 10 the motor is electrically driven and comprises a rotatable shaft 109.

The driving mechanism for the conveyor, as shown in Fig. 2, comprises a shaft 110, which is connected with the motor shaft by a positive drive reduction gear, consisting of a spur gear 111 on the motor shaft and a relatively larger spur gear 112 on the shaft 110, and connected with the conveyor by a belt 113 and pulleys 114 and 115 providing "loose" or "slip" driving relation between the motor and the shaft 71 of the conveyor. As shown in Figs. 8 and 13, the spur gear 112 is loose on the shaft 110 and has formed in its web a circular series of equi-distantly spaced holes, or sockets 116, for coaction with a clutch element 117 keyed to the shaft 110, for rotation therewith and free to move axially thereof.

The electro-mechanical clutch operating means 58, shown in Figs. 2, 10, and 13, comprises a clutch collar 118 for engagement in an annular groove formed in the clutch element 117; a clutch throw 119, for action upon the collar, and which is pivoted to the bed 50 and is normally held to in-clutch position by a spring 120.

Rotatable with the gear 112 is a gear wheel 121 for constant mesh with a gear wheel 122 loosely carried on a shaft 123 journaled in bearings which are parts of a unitary frame 124, which frame also includes a bearing 125 for the shaft 110 whereby to provide position relation between the shafts 110 and 123 and the meshed gears therebetween. Loosely mounted on the shaft 123 is a clutch element 126 which carries a clutch pin 127, which, by spring 128 is normally held in a position to enter a hole 129 which is one of a series, in gear wheel 122, similar to those shown in Figs. 8 and 13 in gear wheel 112.

The clutch pin as shown in Figs. 3, 4, 5 and 6, carries at its outer end a head 130 and at its inner end a shoulder 131 which latter forms an abutment for the spring 128; the opposing abutment being part of a spring cage 132 which is secured to the clutch element as by the screws 133. Mounted on the shaft 123 is an oscillating wedge 134 which normally holds the clutch pin 127 idle, or in out-of-clutch position, and for the movements of the wedge there is a lever 135. By preference, and as shown, cushion blocks 136 are placed between the spring cage and the clutch element 126 to serve as sound deadeners. A solenoid 137 as shown in Figs. 2, 8 and 10, carries an arm 138 for actuating the lever 135, and a spring 139 normally holds the core 140 of the solenoid to extended position. Associated with the clutch element 126 is a cam 141 having dwell 142 for the operation of a lever 143, having an antifriction roller 144 engaging the surface of cam 141, and which lever is connected with a rock shaft 145 having an arm 146 for engagement with an arm 147 carried by a shaft (the recited pivotal support of the clutch throw) as shown in Figs. 2, 3, 4 and 10. Carried at the free end of one of the arms 146—147 is an adjustable contact, preferably a set screw 148 whereby to provide variable throw distance of the clutch element 117.

*The printing gear*

Supported by the unitary frame 124 above the recited bearings for the shaft 123 are the bearings 149 for the drive shaft 150 of the printing means, keyed to the shaft 150 is a spur gear 151 for constant mesh with a gear wheel 152 rotatable by the clutch element 126, (Figs. 2 and 10).

*The printing head*

The printing head is constructed as a distinct unit and comprises a frame, or casing, consisting of separable parts, including a base section 153 and a cap section 154, Fig. 14. Mounted in the cap section is a driven shaft 155 to which all of the actuating parts of the head are related. To provide definite allocation of the printing head relative to the assembly element and conveyor whereby its driven shaft 155 is properly alined with the driving shaft 150, a series of holes 156 are formed in the base section 153 to receive pins 157 fixed to project from the assembly element.

A coupling 158 is provided for facile connection and disconnection of the shafts 150 and 155, (Fig. 10). The coupling 158 is adapted in disconnected position to engage locking pins 162 fixed to cap 154 of the printing head to fix shaft 155 against rotation.

As shown, in Figs. 10 and 14, the base section 153 and cap section 154 are shaped to form a throat 170, resident in the path of mail pieces carried on the conveyor, and wholly inside of or clear from conveyor elements. Carried by the base section and preferably formed as an integral part thereof, is a housing 171, see Figs. 14 and 18, containing elastic elements 172, preferably in the form of helical compression springs for the support of a carriage 173 for the platen 174, which latter is by preference formed of yielding material such as soft rubber, whereby to automatically conform to irregularities in contours of the mailing pieces, see Fig. 15, to the end that uniformly plane surfaces may be presented for indicia impressions, while the elastic platen supports correct angular deflections of the mailing pieces both longitudinally and laterally relative to their path as defined by the conveyor. As best shown in Fig. 18 the spring housing 171 and the carriage 173 are provided with interlocking devices, or lugs, 175, whereby to limit movement of the carriage vertical to the housing, and to lock the carriage against lateral movements there is provided a spring latch 176, see Fig. 14.

The recited lugs and latch prevent complete separation of the carriage and housing, except upon release of the latch, for which purpose access may be had through opening 177 formed in the wall 178 of the housing.

As best shown in Fig. 14 the cap 154 is open to the throat 170 to provide for movements of the printing member 179 and guard box 180 relative to the platen.

The printing member, see Fig. 14, comprises a bed 181, and a pair of carrying arms 182. The bed is, by means such as the rabbet 183, designed to provide removable and replaceable support for an indicia plate 184, and by means such as the cavity 185 see Figs. 15 and 19 and bayonet slots 186 see Fig. 14, designed to removably and replaceably receive and secure a type holder, or dater, 187, see Figs. 20 and 15, which latter is provided with pins, or projections 188 for coaction with said bayonet slots. The printing member carries a roller 189 at its bed, see Fig. 14, and the arms are pivotally connected with a yoke 190 having a swinging support as at 191 and carries a roller 192 for engagement in a race 193 formed in the face of the drum cam 194 rotatable with the driven shaft 155, whereby the bed is projected to approximate printing position in the throat, as shown in dotted lines in Fig. 14, and withdrawn into the casing following a printing stroke, as shown by full lines in Fig. 14. The recited roller 189 rides freely in a track 195, which is secured to an inside face of the cap, and which is so shaped as to direct movements of the bed vertical to the platen.

For the movement of the bed from the position as determined by the roller 189 and track 195, to indicia impression position, there is a contact 196, preferably of anti-friction type and comprising a ball bearing roller, carried by the bed and arranged to be acted upon by a cam 197 rotatable with the driven shaft 155, which cam in its sweep wipes the contact and imparts to the bed the required pressure for indicia imprinting. (See Figs. 14 and 18.)

Inking of the indicia plate, see Fig. 14, is accomplished by means of an inking roller 198, which is supported in a frame 199 secured in the base 153 in a position holding the inking roller in the path of the indicia plate 184, and mounted in the frame 199 is a distributing roller 200, which is supplied from a well 201, and which distributing roller is actuated by a ratchet device 202 and a pusher 203 carried by the yoke 190. For access to the well for purposes of cleaning and replenishing, see Fig. 10, there is an opening 204 in the base which is provided with a key controlled closure 205.

Guard for printing member

As best shown in Figs. 14 and 15 the printing member carrying the indicia plate and dater, is associated with means, for preventing tampering with the indicia; for preparing the mail pieces to receive an impression; for holding the mail pieces against removal and replacement during the impression moment, and for initiating sealing. Primarily this means consists of the recited guard box 180, having an open top and an open bottom, as shown in Figs. 15 and 17, and carried for oscillating movement upon arms 206 which are pivotally supported as at 207 and normally held in elevated position as by a spring 208. The guard box carries an antifriction roller 209 which coacts with a cam 210 rotatable with driven shaft 155.

As shown in Figs. 14, 15, 18 and 19, the cam 210 has a sweep radius less than the sweep radius of the cam 197 whereby the travel distance of the printing member 179 is greater than the travel distance of the guard box. In Fig. 15 the printing member is in printing position and there is shown a mail piece 211 in printing position, the platen conformed therewith, the guard box acting on the mail piece to prepare, i. e., flatten the impression receiving area and to bind thereon to prevent its movement from printing position.

The recited wall 178, forming part of the housing for the springs of the platen carriage, is extended to substantially the plane of the elevated guard box 180 as best shown in Fig. 14 to constitute an obstruction at the base of the throat 170 preventing access or tampering with the printing member and more particularly the indicia plate and dater, when withdrawn, or out of impression position.

Supplementing the physical guarding of the printing member as by the guard box and wall 178 there is a means in the form of a friction clutch 212, see Figs. 14 and 16, providing unidirectional rotation of the driven shaft 155, to the end that the guard box and printing member cannot be reversed in either directional movement.

By preference and as shown the clutch comprises an element 213 preferably fixed to member 154, and carries a plurality of spring actuated dogs 214 and an element 215 rotatable with the driven shaft 155, and having a notched perimeter bearing such relation to said dogs as to be freely revoluble in one rotational direction and positively engaged by the dogs as to be prevented from rotation in the other direction.

The meters

For counting and recording in ascending sequence the number of strokes of the printing member, there is a meter 216, which may be of conventional construction, and comprises, a series of decimal wheels 218, and a gear train driven by a ring gear 220 on the driven shaft 155.

For economy in construction and space the described meter is assembled in a frame 221, in which there is a second meter 222 which is a descending, resettable meter and may be of any conventional construction and similar to the construction of the counting and recording meter, and the meter 222 is gear driven by suitable gearing including the wheel 219.

Meter controlled lock for printing means

In order to prevent indicia impressions after the meter 222 has exhausted its preset number, the driven shaft 155 is locked as by a stud 244, see Fig. 25, rotatable with the shaft and by preference carried on the element 215 of the clutch, and a bolt 245 swiveled as at 246 for movement into and out of the path of the stud. Such movement is affected by a link 247, and an arm 248 fixed to a shaft 249, rotatably mounted as at 250, and extending to be operated by the meter 222, all of which is more particularly described and claimed in my co-pending application.

As best shown in Figs. 14 and 17 the meters are housed in a case 259 for the purpose of dust proofing and to prevent access to their working parts as by a tool, not shown, that may with evil intent be inserted through the throat of the printing head and for convenience in meter reading the cap 154 is provided with a glazed opening 260, see Fig. 14.

Heretofore it has been described how the indicia plate 184 could be removed and replaced, and to provide for changes in the dater its typeholder 187 has formed therein parallel grooves for the reception of type 261 in whose margins there are formed notches 262 to receive a retaining ring 263 which is locked in proper type holding position as by an annular groove 264 formed in the holder 187, see Figs. 20 to 24. Changing of the date requires bodily removal of the typeholder from the printing head for which purpose there is formed in the casing cap a hole 265 (Fig. 19). The removal is accomplished by means of a key 266, (Fig. 20) having pins 267 for engaging holes 268 in the typeholder whereby the typeholder may be rotated to release its projections 188 from the bayonet slots 186 in the printing member. Rotation of the key is facilitated by means of wings 269, and the key is formed tubular for accommodation of a lifter, 270, which is threaded at its lower end and arranged for connection with the typeholder as by means of the internally threaded seat 271. The described closure 204 for access to the ink well is provided with holes 272 and a threaded hole 273 to receive the pins 267 and threaded end of the lifter 270, whereby the single key may be employed for the two uses, (see Fig. 10).

*Electric control system*

There are in the machine, a primary motor circuit, including the motor 55, and switches 274 and 275 for its control, and a secondary motor circuit including the motor and a switch 276, see Fig. 2.

Fixed in the assembly element is a plug socket, or like device, 277, including the terminals 278 and 279 of both motor circuits. The switch 274 is a main switch, which is directly connected on one side with terminal 279, and on its other side by primary circuit wire 280 with switch 275. Leading from switch 275 is a wire 281 connected with one post of the motor, the other post of the motor being connected directly to terminal 278. The switch 276 is connected on one side with circuit wire 280 and on its other side connected with wire 281 whereby switch 276 acts as a relay to complete the motor circuit at a time when switch 275 is open.

The wiring includes a third circuit containing the described solenoid 58, and switch 275, and switches 282 and 283. This third, or solenoid circuit is connected on one side with terminal 278 by wire 284, and on its other side to main switch 274 by wire 280. The switch 275 is a double switch of conventional, spring opening design, the one side of which, as described, is in the primary motor circuit, and the other side of which is in the solenoid circuit, both sides being simultaneously closed by action of a pin 285 forming part of the locating means including the pins 157 for relating the press head to the assembly element as best shown in Fig. 14.

The pin 285 is normally held to switch closing position by a plunger 286 (see Fig. 14); a bell crank trip 287 and the described bolt 245 and is moved to switch opening position by a spring 288 (see Fig. 25) which only functions at a time when the bolt 245 is shifted by the meter upon reaching a zero reading, thus opening both motor and solenoid circuits.

The switch 282 in the solenoid circuit is of convenitonal, spring opening design and is normally held closed by a button 289 and a cam 290 (see Fig. 2) carried by a manipulative stem 291 which is supported as by threaded connection 292 with a post 293 fixed to the assembly element (see Fig. 10). The stem is projected through casing element 52, and carries at its exposed end a knob 294 (see Fig. 8) and a sweep 295, having at its free end a convex closure 296 for the hole 265, providing access to the dater and such means provides switch closing only upon a bringing of the closure to full closing relation, or seating, in the hole 265, and coacts with the switch 275 to a requirement of definiteness of parts relation.

The switch 283 (see Figs. 2 and 10) in the solenoid circuit is of conventional spring opening design, and is mounted on a carrier 297 adjustably secured to the assembly element as by a set screw 298, whereby the switch handle 299 may be variably set relative to the path of a switch throw 300, mounted for limited vertical rocking motion as by a stem 301 suspended from a rod 302, pivotally supported as at 303, and carrying at its free end a finger 304 extending across the path of mail pieces, as carried by the conveyor, and movable lengthwise of the conveyor and in front of the throat of the printing head. For convenience said rod and finger will be hereinafter termed the interrupter 305.

The switch 283 is closed by a movement of the interrupter, as effected by passage of a mail piece, and through switch throw 300 by its engagement with the switch handle 299. The closing of the switch effects action of the solenoid 58 to cause clutch 126 to effect operation of the printing means, and to cause clutch 57 to effect stopping of the conveyor. The interrupter is returned to initialy position by a restoring spring 306 (see Fig. 2) and the switch throw is restored to initial position by a lever 307 (see Fig. 10) which is acted upon by the described clutch pin 127.

To prevent overheating of the solenoid the opening of its circuit is effected immediately following a completion of the described clutch actions, and to this end and as best shown in Fig. 10, the lever 307 resides adjacent the starting point of the pin 127 (see Fig. 3) the lever 307 is held to intimate relation with the switch throw 300 as by a spring 308 which spring also acts to hold the switch throw in position to engage the switch handle.

The core of the solenoid is normally held in elevated position by tension spring 139, and the arm 135, in position to hold the wedge 134, holding the clutch pin 127, in out-of-clutch position, see Fig. 5, and at the instant of solenoid energization the core and arm 135 act to withdraw the wedge to permit the clutch pin to spring to clutching position, Figs. 3 and 6, whereupon the clutch pin in its movement engages the lever 307, and effects switch opening to cut off electric flow to the solenoid, to allow the core 140 to be restored by spring 139, thus raising arm 135, and positioning wedge 134 to disengage clutch pin 130 upon completion of its cycle.

To permit continuous passage of the mail pieces through the machine there is requirement for movement of the interrupter into and out of their path, which is accomplished by means of a hook 309 secured to the assembly element by bearing 310 at the terminal end of the stroke of the interrupter, and normally held elevated by a spring 311. To depress the hook for lowering the interrupter out of the path of mail pieces, there is a lever 312 (Fig. 8) which is connected at its one end to said hook and acted upon at its other end by a lift 313 carried on a rock shaft 314 (see Fig. 10) having an arm 315, (see Figs. 2 and 3) lying in the path of clutch pin 127, so that upon each clutch cycle the interrupter is moved downwardly to permit the passage of a piece of mail, and by said mail piece held down, and then carried to initial position by spring 306 when spring 316 and a fulcrum, the recited pivotal support, 303, act to elevate the interrupter into the path of a succeeding mail piece. Carried by frame 297 there is a safety device 317, comprising a surface 318 inclined relative to the path of travel of the switch handle 299, and substantially parallel to the path of the throw 300 as defined by the lever 307, which device affords a positive lift, or release, movement of the throw whereby to disconnect current from the solenoid in the event of failure of the lever 307 to properly function. The recited switch 276, as best shown in Figs. 2, 8 and 9 and described as the relay switch in the motor circuit, has incorporated therewith a spring-pressed block 319 which is so designed as to be depressed upon a movement of the switch handle 320 to circuit closing position.

Connected with the block 319 is a push rod 321 which is extended to and connected with a rock shaft 322, which rock shaft is provided with an arm 323 residing at the initial end of the path of the interrupter, whereby when the switch is thrown to circuit closing position, the interrupter will be automatically lowered from the path of mail pieces, and the printing member idled to the end that the machine may be employed for sealing only. Obviously, when the switch 276 is thrown to open position, the interrupter is restored to functioning condition, so that sealing and printing may be performed as joint operations.

It is essential that the mail pieces be properly related to the conveyor and the moistening and printing stations, therefore the rack is adjusted to the width dimensions of the mail pieces and hence serves to deliver them alined with the conveyor. To preserve such alinement at the moistening station, I provide a roller 324, which is loosely rotatably supported on a spring tensioned arm 325 carried on a stub shaft 326, (Fig. 2) which roller has a divided surface for contact with the mail pieces only in lines opposite the tire 76 and belt 75. To further preserve such alining at the printing station there is a roller 327 carried on a shaft 328 on a spring tensioned arm 329 supported on the recited stub shaft 326. The roller 327 and its supporting means may be identically like the roller 324, and its support, and for their more intimate adherence to mail pieces I prefer that their peripheral surfaces be composed of porous, soft rubber, whose actions will be that of "vacuum treads."

To provide for the operations of the printing member and its guard, there is requirement for unobstructed paths for their movements relative to the platen. To this end the conveyor belt is located beyond their paths, and engages each mail piece in a line along one longitudinal margin only, which by reason, such as improper action of the interrupter, may result in disalinement of the mail piece. Carried on a shaft 330 rotatably supported by the assembly element beneath the shaft 328, is a roller 331 for engagement with the mail pieces opposite the one divided surface of the roller 327, and along a line removed from the line of the conveyor. In order to provide positive drive of the mail pieces at their margins opposite the conveyor belt, the roller 331 is keyed to shaft 330 and said shaft is driven as by a pulley 332 in engagement with the conveyor belt, all bearing such relation as to provide a peripheral speed of the roller 331 identical with the travel speed of the belt so that the mail pieces are carried from their alined positions on the conveyor to similarly alined positions at the printing point. (See Figs. 8 and 12.)

For the preservation of the alinement of the mail pieces in their entire travel through the throat, and in their discharge therefrom, I provide a spring tensioned presser bar 333 which stands immediately over the conveyor belt 75, and hinged to the terminal end of the presser bar, to extend beyond the normal plane of the belt 75, is a support 334 carrying at its free end a discharge wheel 335, gravity actuated to cause a downward direction of the mail pieces upon their release from the conveyor, and to hold them faced for sealing and stacking as will be hereinafter described.

The moistener 91 may have its inlet 100 connected with any source of water supply, but by preference I provide a supply comprising a level tank 336, secured to the assembly element as by a detachable connection such as the threaded stem and nut 337, (Fig. 29) in a position above the plane of the moistener 91. A tubular connection 338 extends between the tank and moistener, and by preference such connection includes a shut-off valve 339.

For maintaining a more or less constant level in the tank, 336, there may be provided a supply vessel 340, which for convenience and compactness is placed within the assembly element, as shown in Figs. 27 and 28, and provided with a filling opening 341 and a float gage 342. A pump 343 driven from a motor driven element, such as the shaft 71 of the conveyor drive, delivers water through pipe 344 to tank 336 and returns the excess through overflow pipe 345. A sump 346 is located beneath the moistener to catch drip therefrom and a pipe 347 returns such drip to the vessel 340.

The cap and base of the printing head are separably secured as by interlocking lugs 348 and 349 formed respectively on the interior of the cap and base preferably adjacent the throat 170, and at the opposite end of the cap there is a boss 350 having an internally threaded opening 351 for the reception of a screw 352, for extension through the base as shown best in Fig. 19. A counter bore 353 is formed in the base to surround the head of the screw 352, and an annular seat 354 is formed in the counter bore to receive a seal 355, whereby access to the interior for any purpose can only be had with detection.

In the cap and in line with the lock 235, Fig. 18, is a hole 356 having a seat 357 and seal 358, similar to the described seat 354 and seal 355, Fig. 19, to provide detection of meter access or tampering.

The stacker

The stacker is primarily a receptacle to receive the mail pieces as moistened, or/and stamped, delivered and faced from the machine, and in the form shown, in Fig. 1, comprises a box 359 having side and end walls 361 and a vertically movable bottom 360. The stacker while acting to preserve the faced relation of the mail pieces serves also to provide a sealing interval in which the sealing is automatically accomplished by pressure from superimposition of the mail pieces. Mail pieces may be removed from the bottom of the stack by grasping the same through the cut-outs 363.

Separator

To facilitate the handling of the addressed and stamped pieces in the mail, the mailer in order to meet a requirement of the Postmaster General, or a request of a postmaster, must separate the matter, as to addresses, into states, cities, etc., for which purpose there is provided a case 365.

For efficient work-position relating to the machine proper, the stacker and the separator; for the storage of printing heads, keys, dater type tools the feeder rack and the like; for the support for boxes, or container for mail pieces to be acted upon and for housing, and protecting all the recited parts when not in service there is a structure, hereinafter referred to as the cabinet 368, having compartments 370 and shelf 373 serving as a means for widening the conveyor to provide for the proper carrying of mail pieces of extra, or unusual width dimensions. A second hinged shelf 372 may be provided, if desired.

Surmounting the cabinet is a hinged cover 374 forming a hood for the machine proper when not in service.

Operation

Assuming the cabinet to be opened as shown in Fig. 1.

Assuming further the rack 53 mounted upon the assembly element 50 of the machine proper, with its conveyor section operably related to the moistening section of the conveyor; the base 153 of the printing head position related to the assembly element, the plug socket 277 connected with service wires not shown; the motor control switch 275 closed; the switch 282 closed by properly positioning the closure 296 relative the hole 265 providing access to the dater; the main switch 274 closed, relay switch 276 open and the switch 283 open and Assuming further that the solenoid is shut off, its core elevated, the clutch 57 forming driving connection between the conveyor gear 56 and the motor 55 and the clutch pin 127 released from the gear wheel 120; the driving shaft 150 in driving relation with shaft 155 of the printing head by coupling 158; the conveyor as a whole in operation and the printing member and its guard box momentarily idle and withdrawn from printing positions, and Assuming further the hinged leaf 371 of the cabinet opened and a container or box, filled with envelopes, having mail pieces addressed and unsealed, supported upon said leaf 371 and a number of the (mail pieces) envelopes taken from the box and placed, with their flaps down, in the rack, the lowermost envelope is advanced at the speed rate of the roller 82 and moved to be caught by the tires 79 of the moistening section of the conveyor, which travel at a higher speed than the roller 82 and tend to project the recited lowermost envelope forwardly from the pile of envelopes, in which act the stripper 70 aided by the angularity of the rack, the graded speeds of the rack rollers and gate acts to strip the projected envelope from the pile and the presser foot 69 acts to provide positive drive relation between the stripped envelope and the belt 81 to the end that the stripped envelope will by reason of the difference in speed travels of the tires 79 and belt 75 be longitudinally spaced from a second envelope in its remaining travel on the conveyor.

While said lowermost envelope is being advanced from the rack by roller 82, the several succeeding envelopes in the rack are respectively advanced step by step by rollers 85, 84 and 83 so that the roller 82 may continuously deliver to the moistening section of the conveyor.

Each envelope in its travel encounters the fin 102 which successively lowers the envelope flaps 94 for passage beneath the container 92 of the flap moistening means for applying moisture to the gummed surfaces of the flaps. Each envelope thus moistened is brought to engage the interrupter 304 which is moved by the envelope to affect closing of the switch 283 and energization of the solenoid 58 to affect action of clutch pin 127 for relating the printing head driving gear 151 with the motor and to affect action of clutch 57 to disconnect the conveyor drive shaft 115 from the motor.

With the conveyor thus stopped and the envelope in printing position and motionless the cam 210 operates to move the guard box toward the platen 174 and the drive cam 194 and track 195 operate to move the printing member 179 to printing position and a continued movement of the cam 210 operates to affect the bringing of the guard box to a position preparing an area of the envelope for impression reception and to hold the envelope against movement and concurrently cause the cam 197 to impart to the printing head the required pressure for indicia imprinting.

By reason of the gears 220 each cycle of printing head operation affects a unit change of meter reading in ascending sequence in recording meter 216 and descending sequence in reset meter 222. Early in the printing cycle by means of the clutch pin 127, lever 307, throw 300 the switch 281 is opened thus deenergizing solenoid 137, to affect movement of the wedge 136 to a position for engagement with pin 127 for its release from the gear 172 at the end of the printing cycle. Later in the cycle the pin 127 is brought to engage the arm 315 for the movement of the interrupter 304 out of the path of the envelopes. At substantially the end of the printing cycle the pin 127 is engaged by the wedge 136, set as recited, to affect release of the gear 152 from gear 122.

During each printing cycle the printing member is brought from its rest, or idle, position to the described printing position and restored to its rest position concurrently with the described movement of the clutch pin.

In the printing cycle immediately following the impression moment the cam 197 is moved to effect release of the printing member whereby the cam 194 may move the printing member from printing position, and the cam 210 moved to permit the spring 208 to restore the guard box.

At the termination of each printing cycle the lever 143 is brought to occupy the dwell 142 to affect operation of clutch 57 to set the conveyor in motion.

The envelope moistened and stamped is then advanced through the printing head, and the interrupter, described as having been drawn from the envelope path, is by spring 306 released from its lowering means; moved reversely to the conveyor travel and upon the movement of the stamped envelope beyond its return path and before the arrival of a succeeding envelope again brought to elevated and interrupting position.

The several described devices, including the rollers 324 and 327 direct the envelopes uniformly alined for printing, in which the facing, established in the rack, is preserved and the discharge wheel 335 acts to deliver the envelopes, so faced, moistened and printed to the stacker 359 where the sealing is completed by pressure of superimposed envelopes and a sufficient time interval.

The thus sealed envelopes are then manually transferred to the separating case 365, properly separated into states, cities, etc., and divided into the required quantities 366 which may be appropriately designated at 367 for convenience in presentation to the postmaster for inspection and mailing.

The structure of the several mechanisms and the cabinet therefor may be varied in form without departure from my invention as hereinafter claimed. The showing of this description and the drawings being merely in illustration of one embodiment of my invention in response to the statutory requirement to applications for patents.

I claim:

1. In a postal machine, printing means; moistening means; a conveying means relating the moistening and printing means; a driving element to operate the printing means and the conveyor; means for interrupting movements of the mail pieces during printing intervals; means for idling the printing and interrupting means through a controlled drive, for employment of the machine for moistening only, without affecting the physical relation of the printing means to the machine.

2. In a postal machine, power driven conveying and printing means; moistening means in the path of the conveyor; means for interrupting mail pieces during the printing intervals and a control providing either joint or selective operation between the printing and interrupting means and the conveyor.

3. In a postal machine, power driven conveying and printing means; moistening means in the path of the conveyor; means for interrupting mail pieces during the printing intervals; a control providing either joint or selective operation between the printing and interrupting means and the conveyor, and means for electrically operating said control.

4. In a postal machine, the combination of a printing means; a conveyor; a motor for driving the conveyor and printing means; an interrupter; moistening means; means for moving the interrupter to and from functioning position; an electric circuit including, with the motor, a control associated with the interrupter, whereby to idle the conveyor and operate the printing means during printing intervals, and a second control associated with the moving means for the interrupter whereby to provide continuous operation of the conveyor, for moistening, without interruption of the mail pieces, and to provide complete idling of the printing means.

5. In a postal machine, an assembly element; a conveyor; a printing head; a recording mechanism; printing head position relating means; an electric circuit; a motor in said circuit; a master switch in said circuit; a conveyor switch; a selective switch, and a printing head position relating means switch, an interrupter switch operating to stop the conveyor and operate the printing mechanism; within said electric circuit, operating to control said circuit.

6. In a postal machine, an assembly element; a sealing mechanism supported by said assembly element and comprising a conveyor and a moistening device; a printing head; means for bodily detachably relating the head to the assembly element, said head including indicia printing mechanism and resettable impression recording mechanism, and a driven element relating the printing means and the recording mechanism; a motor secured to the assembly element; a gear secured to the assembly element for relating the motor with said sealing mechanism, and the driven element of said head; a separable coupling between said gear and said driven element, and means including position relating means between said head and assembly element, whereby the head may be bodily separated from the assembly element.

7. In a postal machine, an assembly element; a sealing mechanism supported by said assembly element and comprising a conveyor and a moistening device; a printing head; means for bodily detachably relating the head to the assembly element, said head including indicia printing mechanism and resettable impression recording mechanism, and a driven element relating the printing means and the recording mechanism; a motor secured to the assembly element; a gear secured to the assembly element for relating the motor with said sealing mechanism and the driven element of said head; a separable coupling between said gear and said driven element; means including position relating means between said head and assembly element, whereby the head may be bodily separated from the assembly element; and control means supported by said assembly element whereby said motor may be caused to operate said sealing mechanism and said printing means and recording mechanism jointly or selectively.

8. In a postal machine, an assembly element; a sealing mechanism comprising a conveyor and a moistening device; a printing head including indicia printing means and impression recording mechanism and a driven element related to both the printing means and the recording mechanism; a motor; a gear relating said motor with said conveyor and the driven element of said head; a separable coupling between said gear and the driven element of the head, and means including position relating means between said head and the said assembly element, whereby the head may be bodily separated from the assembly element.

9. In a postal machine, a feeding means; a flap moistening means; a printing means; a conveying means for mail matter; a trip for intercepting the mail matter conveyed by said conveyor means; a switch actuated by the movement of said mail matter to effect operation of said printing means to imprint an indicia on said mail matter; and means to control the position of said trip that it may be selectively moved so that it will or will not intercept the mail matter.

10. In a postal machine having a printing point, means for conveying mail matter past said printing point; a printing press bodily removable from and replaceable in the machine adjacent the printing point, said printing press containing an oscillating printing member and registering means comprising a permanent recording meter, and a downward count meter which may be set for a given member of impressions and which will lock the printing press when said given number of impressions are exhausted; a trip mechanism normally residing in the path of mail matter passing through the machine; means controlled by the trip mechanism for operating the printing means and stopping the conveying means each time a piece of mail matter is presented to the printing point in its passage through the machine; and manual controlled means to render the printing press inoperative with relation to the balance of the mechanism of the machine and to remove the trip from the path of mail matter.

11. In a postal machine, a printing press containing a guard member, an oscillatable printing member, an inking element for said printing member, recording elements, and a uni-directional control device; said press being mounted for bodily removal at a printing point in said machine; elements for carrying mail matter to and past said printing point in a position to receive impressions from said printing member; means to cause the mail matter to pause for an interval of time at the printing point; a housing for enclosing said printing press; and means to operate said printing press when in operative position.

12. In a postal machine having a printing point, the combination of means for forwarding mail matter to and past said printing point, a trip normally residing in the path of mail matter presented to said printing point so as to be contacted by a piece of mail matter prior to the same reaching the printing point; a printing press removably situated at the printing point and containing an oscillatable printing member; a printer actuating member connected to the printing press when located in the machine in operative position, a clutch member for connecting the printer actuating member to a drive element when and as the said trip is contacted by a piece of mail matter being forwarded through the machine to stop the forwarding means to cause said piece of mail matter to pause at the printing point for a sufficient interval of time to receive an impression from the printing member as actuated by the drive element through said clutch member; said means to permit manual removal of said trip and to restrain said trip from entering the path of mail matter passing through the machine.

13. In a postal machine, printing means establishing a printing point in said machine; means for forwarding mail matter to and past said printing point; clutch controlled driving means for operating the printing means; a trip mechanism, part of which normally resides within the path of the mail matter prior to its reaching the printing point, and being actuated by said mail matter, electrically operated means actuated by said trip mechanism; a clutch operated by said electrically operated means to cause the printing means to operate once for each piece of mail matter passing through the machine, a second clutch operated by said first mentioned clutch to stop the forwarding means for a sufficient interval to permit the printing means to make an impression on a piece of mail matter.

14. In a postal machine, a printing press containing a guard member, an oscillating printing member, an inking device, a unidirectional control, a perpetual total recording meter and a downward count register adapted to be set for a predetermined number of impressions and which will lock the printing press when the total predetermined number of impressions have been made; a casing housing said printing press and having a throat for the introduction of mail matter as presented to the printing press; means to lock said casing; an actuating element for said printing press contacted by an adjacent portion of a driving element when said printing press is in operative position in the machine; means to operate said printing press when in operative position on said machine; means to retain said printing press in operative position in said machine; and means to manually operate control elements to make said printing press inoperative when in said machine.

15. In a postal machine, a base section provided with a casing containing the drive elements and controls; a casing removably attached to said base and containing a printing press unit comprising a guard member, an oscillating printing member, a resilient platen for said printing member, an inking device, a recording meter, a reset meter and a uni-directional control; the said printing press unit being so constructed and arranged as to be removable from and replaceable in the machine only as one intact unit within said removable casing; means to print indicia upon mail matter while the said unit is in operative position in the machine and locked against unauthorized access; means to operate said printing press; and means to manually set said printing press in inoperative relation to the balance of the machine.

16. In a postal machine, a power section provided with a casing containing control and drive elements; a unitary case removably attached to said power section and containing a printing press comprising a drive shaft, an oscillating guard box actuated thereby, an oscillating printing member actuated by said shaft and provided with type forms for printing indicia on mail matter, including a removable dater device and means for removing said dater when said case is locked, an inking device for said type forms operated by said printing member; a perpetual total recording meter; a resettable downward count register including means to reset said register while locked within said case, and adapted when operated to a zero point to operate a lock to lock said drive shaft; controls connected to said register to prevent operation of the drive elements in the said power section; when said register is operated to a zero point; a non-reverse device on said drive shaft restraining the rotation of said drive shaft to one direction only; means preventing the obtaining of more than one impression from the said printing member during each operation of the machine; said meter and register being actuated by said drive shaft to record each operation of the printing member; a resilient platen to which the said guard box positions the mail matter for receiving impressions from said printing member; means to position said unitary case in operative relation to said machine; means to operate said drive shaft when said printing press is in operative position in said machine; means to control the operation of said printing press when in operative position in said machine comprising a trip mechanism extending into the path of mail matter passing through the machine and adapted to be contacted by a piece of mail matter and actuated thereby to control the drive elements; and means to manually control the operations of the printing press in independent operative relation to the machine.

17. In a postal machine, a printing press; driving and driven elements; gearing connecting said driving and driven elements; clutches for controlling said gearing, one of said clutches being dependent for control upon the action of a second clutch, said second clutch being actuated by an electric control system comprising circuits; means to pass mail matter through said machines; a switch element to control said electric system; a trip device within said machine, said trip device being positioned in the path of mail matter passing through the machine to be contacted by a piece of mail matter to operate said switch element to control said electric system to operate said second clutch; means to relate said printing press operatively to said driving and driven elements; means to control the operation of said press in relation to said driving elements; means to maintain said press in operable relation to said driving elements; means to idle said press in relation to said driving elements; means to control said driving elements to idle said press; means within said printing press to break said electric circuit and lock said press against further operation after a predetermined number of impressions of said press; and means to restore said press to operable condition after said locking operation.

18. In a postal machine, a printing press containing a driven shaft, a guard member and an oscillatable printing member coordinately operated by said driven shaft, a yieldable platen for said printing member, a uni-directional control on said shaft; a perpetual recording meter and a resettable downward count meter operated by said shaft; driving and driven elements and gearing connecting the same; means for advancing mail toward the said printing press including a moistener; means operated by the mail matter passing through the postal machine for automatically controlling operation of the printing member and the means for advancing mail matter; and means for operating said driving and driven elements.

19. In a postal machine, a printing press containing a driven shaft, a guard member and an oscillatable printing member coordinately operated by said driven shaft, a yieldable platen for said printing member, a uni-directional control on said shaft; a perpetual recording meter and a resettable downward count meter operated by said shaft; driving and driven elements and gearing connecting same; means for advancing mail matter toward the said printing press, including a moistener; means operated by the mail matter passing through the machine for automatically controlling operation of the printing member and the means for advancing mail matter; means to manually operate a control to idle said printing press relative to the machine to permit only moistening and sealing of mail matter; and means for operating said driving and driven elements.

20. In a postal machine, a printing press containing a driven shaft, a guard member and an oscillatable printing member actuated by a driven shaft, a yieldable platen for said printing member, a uni-directional control and a lock pin on said driven shaft; a reset meter to operate said lock pin; a switch element; a unitary case enclosing said printing press; driving and driven elements and connecting gearing, said case being removably positioned in said machine to establish a printing point in operable relation with said driving and driven elements; means to forward mail matter to said printing point; said driving and driven elements, gearing and forwarding means residing in a casing in operable position to receive the said printing press casing, both of said casings residing in an outer casing forming a work supporting means for the mail matter forwarding means; and means to operate the said printing press when mounted in said machine.

21. In a postal machine, a printing press establishing a printing point and comprising a driven shaft, a guard member and an oscillatable printing member actuated by said driven shaft, a yieldable platen for said printing member, a uni-directional control and a lock on said shaft to control the movements of said printing member; a reset meter to operate said lock; a switch element; a unitary case enclosing said printing press; power, driving and driven elements including connecting gearing; said case being removably positioned in said machine in operable relation with said power, driving and driven elements; means to forward mail matter to said printing point; said power, driving and driven elements, gearing and clutches, electric circuits and switches, and the forwarding means all residing in a power casing adapted to receive the said unitary case and enclosed elements, a cover on said power casing; means to retain said unitary case in position on said power casing for relative operation of the parts contained within each case; and means to prevent operation of the printing press when said retaining means is not properly positioned to said unitary case.

22. In a postal machine as set forth in claim 21, and means to prevent the removal of said power case cover when said printing press case is mounted in position for operation of its contained parts.

23. In a postal machine, a lock casing containing a printing press comprising a driven shaft, a printing member, a guard box therefor, a non-reverse element connected to said shaft, a cam for providing vertical movement for said printing member, a cam providing vertical movement for said guard box, a perpetual recording meter and a downward count resettable meter, resetting mechanism for said resettable meter, an inking device, a removable ink well; means for permitting removal and replacing of said ink well while said casing is closed and locked; means to convey ink from said ink well to said printing member; and means connected to operate said ink conveying means by operation of said printing member.

24. In a postal machine, means for conveying mail matter past a printing point; a printing press bodily removable from and replaceable in the machine adjacent said printing point and comprising an oscillating printing member, registering means comprising a total recording meter, and a downward count meter which may be set for a given number of impressions and which will lock the printing press when said impressions are exhausted; a trip mechanism normally located in the path of mail matter passing through the machine; means controlled by the trip mechanism for operating the printing press and stopping the conveying means each time a piece of mail matter is presented to the printing point in its passage through the postal machine; and manual controlled means to render the printing press inoperative, with relation to the balance of the mechanism of the machine, and to remove the trip from the path of mail matter.

25. In a postal machine, a printing press containing a guard member, an oscillating printing member, an inking element therefor, recording elements, and a uni-directional control device; elements for carrying mail matter to and past said printing press in a position to receive impressions therefrom; means to record each impression within said recording elements; means to cause the mail matter to pause at said printing press for an interval to receive an impression therefrom; a casing enclosing said printing press; means to permit bodily removal of said casing and printing press from and to permit replacing the same in said postal machine; and controlled means to operate said printing press when in operative position.

26. In a postal machine having a printing point, the combination of means for forwarding mail matter to and past the printing point, a trip normally located in the path of mail matter in advance of said mail matter reaching the printing point and causing said mail matter to pause at the printing point; a printing press removably situated at the printing point and containing an oscillating printing member; a drive element for said press; a printer actuating member contacted by the printing press when said press is located in the machine in operative position; a clutch member for connecting the printer actuating member to said drive element when and as the said trip is contacted by the mail matter reaching the printing point to stop the forwarding means to cause the letter to pause at the printing point for a sufficient interval of time to receive an impression from the printer as actuated by said drive element through said clutch member; and means to manually remove and restrain said trip from entering the path of mail matter passing through the machine.

27. In a postal machine, a printing press; a locked casing enclosing said printing press, said casing having a throat through which mail matter is adapted to be moved; a housing below said throat; a carriage slidably mounted on said housing; a platen supported by said carriage; resilient means in said housing supporting said carriage and platen; means to retain said carriage against lateral movement on said housing; and means to cause said press to make impressions on mail matter received on said platen.

In testimony whereof, I hereunto affix my signature this 12th day of October, 1928.

RALPH G. WHITLOCK.